US 6,463,515 B1

(12) United States Patent
Stedman et al.

(10) Patent No.: US 6,463,515 B1
(45) Date of Patent: Oct. 8, 2002

(54) SYSTEM AND METHOD FOR RECOVERING PHYSICAL MEMORY LOCATIONS IN A COMPUTER SYSTEM

(75) Inventors: Roy W. Stedman; Gary D. Huber; Thomas Vrhel, Jr., all of Austin, TX (US)

(73) Assignee: Dell Products L.P., Round Rock, TX (US)

( * ) Notice: Subject to any disclaimer, the term of this patent is extended or adjusted under 35 U.S.C. 154(b) by 146 days.

(21) Appl. No.: 09/603,033

(22) Filed: Jun. 23, 2000

(51) Int. Cl.⁷ .............................................. G06F 12/00
(52) U.S. Cl. .................................................... 711/170
(58) Field of Search ........................................ 711/170

(56) References Cited

U.S. PATENT DOCUMENTS

| | | | |
|---|---|---|---|
| 3,593,315 A | 7/1971 | Patel | 711/220 |
| 4,775,932 A | 10/1988 | Oxley et al. | 707/206 |
| 5,689,707 A | 11/1997 | Donnelly | 707/206 |
| 5,784,698 A | 7/1998 | Brady et al. | 711/171 |
| 5,802,341 A * | 9/1998 | Kline et al. | 711/209 |
| 5,819,100 A | 10/1998 | Pearce | 713/323 |
| 5,842,019 A | 11/1998 | Kolawa et al. | 717/1 |
| 5,991,893 A * | 11/1999 | Snider | 714/4 |
| 6,119,248 A | 9/2000 | Merkin | 714/52 |
| 6,148,350 A * | 11/2000 | Chen et al. | 710/62 |

OTHER PUBLICATIONS

The Waite Group's MS–DOS® Papers for MS–DOS Developers and Power Users, 1988, pp. 535–561.*
Patent Abstracts of Japan, Publication No. 03148733A; Jun. 25, 1991; Yoshio et al.
Patent Abstracts of Japan Publication No. 05225054A; Sep. 3, 1993; Hiroshi.
Patent Abstracts of Japan, Publication No. 09198299A; Jul. 31, 1997; Toshio.

* cited by examiner

Primary Examiner—David L. Robertson
(74) Attorney, Agent, or Firm—Baker Botts, L.L.P.

(57) ABSTRACT

System and methods for recovering memory for computer systems are disclosed. A method for recovering physical memory within a computer system having a memory device is disclosed. The method includes detecting an event associated with the system, allocating memory based upon the detected event, and accessing at least one portion of physical memory in association with the allocated memory. Upon accessing physical memory the method further includes deallocating at least one portion of physical memory, wherein the deallocated physical memory is operable to be used in association with the event.

18 Claims, 2 Drawing Sheets

SYSTEM AND METHOD FOR RECOVERING PHYSICAL MEMORY LOCATIONS IN A COMPUTER SYSTEM

TECHNICAL FIELD

The present disclosure generally relates to computer systems and, more particularly, to system and methods for recovering memory for computer systems.

BACKGROUND

Limited availability of physical memory has brought about different methods of allocating and utilizing physical memory for computer systems. One method deployed by conventional systems includes allocating virtual memory to "free up" physical memory space. The method, called paging, uses a peripheral device, such as a hard disk drive, to provide virtual memory storage. The technique involves providing a virtual address space that is divided into a number of fixed-size blocks called pages. Each page is mapped onto any physical memory address available to a system. During use, a special memory management unit performs an address translation from the virtual address to the system's physical memory address.

Paging is commonly used by conventional systems to swap pages of information or data between virtual and physical memory locations enabling conventional systems to execute programs and manipulate data files that are larger than the available physical memory. An operating system can copy as much program data or information as possible into physical memory locations while leaving the rest on a hard drive. Therefore, an operating system can address more logical memory than is physically available system.

In some instances, pages or series of pages may be moved between physical memory and storage devices as they are needed during the execution of a program. For example, a "reduce" function for altering the size of a program window may be stored in a virtual memory space, such as a hard drive, and swapped into physical memory when requested by a system. During the swap, the contents within the physical memory locations are copied to a hard drive and the data associated with the "reduce" function is copied into the available physical memory location. In this manner, an operating system can access a storage device when an application requests information or data and exchange pages of data stored in physical memory with information stored within the storage device for freeing up physical memory.

Problems can occur when conventional systems page or swap data in and out of physical memory locations. For example, an application may allocate amounts of memory that do not match the available memory blocks. The system will then split an available block into the size requested and another available block. As this process continues, the available memory blocks tend to decrease in size and become scattered throughout physical memory, causing physical memory to become fragmented. The fragmented physical memory may lead to inefficient use and allocation of the system's physical memory. As a result, a system may become inefficient due to delays caused by paging information in and out of physical memory in order to free up enough physical memory to execute an application.

Another potential disadvantage of present systems is not deallocating memory upon terminating a process or program. Processes or programs that do not deallocate memory may cause memory leaks thereby causing limited memory availability for subsequent programs or applications.

Some applications reserve and commit memory blocks during execution of the application, increasing requirements for physical memory during operation.

Current systems may also allocate certain pages within a memory block and then deallocate the pages during execution of an application. This allocating and de-allocating of pages cause physical memory to become fragmented. For example, a system may assume that a block of memory that has been allocated is contiguous. However, this may not be the case if only a page or section of memory has been deallocated. This creates fragments within physical memory which lead to both inefficient utilization of memory and potential leakage to subsequent programs or applications.

Therefore, current solutions for managing memory can leave systems with limited amounts of physical memory for executing critical processes such as powering down or suspending a system. Through inefficient allocation of memory and problematic memory leaks, some critical and non-critical processes may improperly execute or unintentionally lock-up a system indefinitely.

SUMMARY

In the present disclosure, a system and methods are described for efficient utilization of system memory.

According to one aspect of the present disclosure, a method for recovering physical memory in a computer system having a memory device and an operating system is disclosed. The method includes allocating memory within the system, accessing the recoverable physical memory associated with the allocated memory, and deallocating the allocated memory upon accessing the recoverable physical memory.

According to another aspect of the present disclosure, a method for recovering physical memory associated with a computer system having a memory device and an operating system is disclosed. The method includes detecting an event associated with a process, allocating a portion of the physical memory in response to the event, accessing the allocated portion of physical memory, and deallocating the portion of physical memory.

According to another aspect of the present disclosure, a computer system is disclosed. The system includes at least one processor, at least one storage device, at least one memory device coupled to the processor, and a program of instructions associated with the system. The program of instructions includes at least one instruction to allocate a portion of the memory device in response to an event, at least one instruction to access a memory location associated with the allocated portion of the memory device, and at least one instruction to deallocate the allocated portion of the memory device, wherein the deallocated memory becomes available to be used in association with the event.

According to another aspect of the present disclosure, a method for recovering physical memory within a computer system having a memory device is disclosed. The method includes detecting an event requiring a memory size and allocating memory based upon the detected event. The method also includes accessing at least one portion of physical memory in association with the allocated memory and deallocating the at least one portion of physical memory, wherein the deallocated physical memory operable to be used in association with the event.

One technical advantage of the present disclosure includes providing a system and method for recovering physical memory.

Another technical advantage of the present disclosure includes reducing the effect of memory leaks to subsequent or parallel processes or applications.

A further technical advantage of the present disclosure includes providing a system and methods for increasing availability of physical memory for utilization.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

The conceptual groundwork for the present disclosure involves recovering physical memory within a computer system. A computer system is provided having efficient utilization of physical memory for storing executable code, variables, messages, pointers, or other information operable to be stored within physical memory of the computer system. Physical memory may be recovered through allocating and deallocating memory upon receiving an event. Access to memory locations associated with the allocated memory is made such that physical memory must be provided in association with the allocated memory. Upon accessing the memory locations, the allocated memory is then deallocated thereby freeing up available memory for utilization. In this manner, physical memory may be recovered for critical and non-critical processes or programs.

Figure 1:
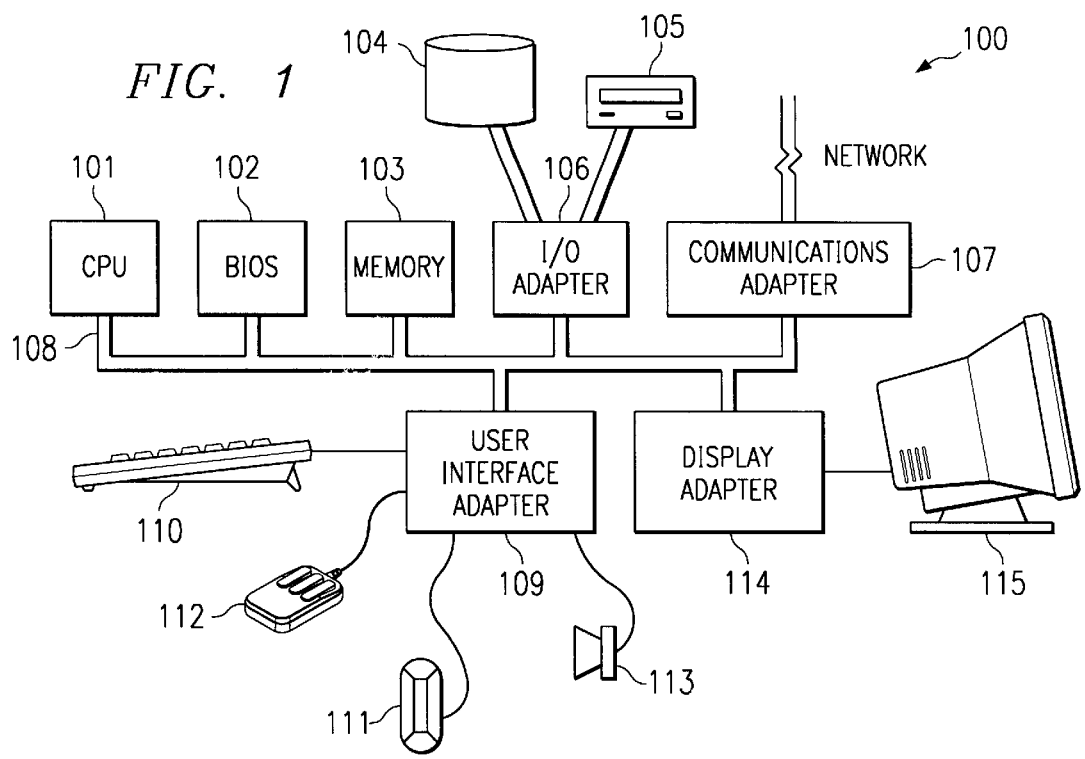
FIG. 1 is a block diagram of a computer system illustrative of one embodiment of the present disclosure.

Referring to FIG. 1, a block diagram of a computer system illustrative of one embodiment of the present disclosure is shown. A system, indicated generally at 100, includes a central processing unit (CPU) 101 connected via at least one bus 108 to a basic input output system (BIOS) firmware 102, and memory, such as RAM, ROM, EEPROM, and other memory devices, collectively designated by reference numeral 103. System 100 further includes an input/output adapter 106 for connecting peripheral devices such as disk drive 104 and tape drive 105, and a display adapter 114 for connecting a display device 115 such as a Flat Panel Display (FPD) or. a Cathode Ray Tube (CRT).

A user interface adapter 109 is provided for connecting a keyboard 110, a mouse 112, a speaker 113, a microphone 111, and/or other user interface devices such as game controllers, touch pads, etc. System 100 also includes a communications adapter 107 for connecting system 100 to an information network such as an Intranet or the Internet. BIOS firmware 102 includes a built-in software program, referenced generally as BIOS, accessible to system 100. The BIOS includes instructions for controlling the system's devices and testing memory when system 100 is initially powered up.

Efficient use of memory 103 is maintained by system 100 through recovering physical memory locations within memory 103. Physical memory may be recovered through allocating memory and accessing the allocated memory. The allocated memory may then be deallocated thereby ensuring that physical memory is available for use. In one embodiment, accessing the allocated memory may include touching each allocated location wherein one embodiment touching may include reading, writing, copying, or other functions such that physical memory locations may be accessed. In one embodiment, upon touching each physical memory location, an operating system associated with system 100 may page out or copy information to a storage device such as hard drive 104. In this manner, physical memory may be recovered through paging or copying information to a storage device thereby freeing up physical memory locations.

Figure 2:
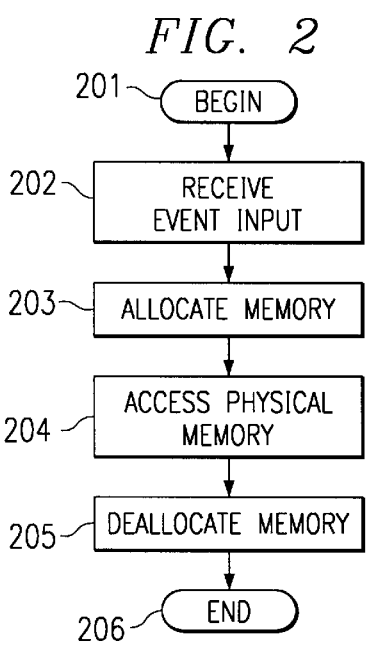
FIG. 2 is an illustration of a flow diagram of a method for recovering memory according to an embodiment of the present disclosure.

FIG. 2 is an illustration of a flow diagram of a method for recovering memory according to one embodiment of the present disclosure. The method may be operable to be used by system 100 as illustrated in FIG. 1 or other systems operable to deploy the method illustrated in FIG. 2.

The method begins at step 201. At step 202, an event is received by the system. The event may include, but is not limited to, an event associated with a critical process, an event associated with a non-critical process, an event associated with a utility, etc., or other events operable to be received at step 202. The method then proceeds to step 203 where the method allocates for example, thirty-two kilobytes of memory within the system. In one embodiment, allocating memory may include reserving memory without actually having physical memory available when allocated. For example, several processes associated with a system may allocate the same physical memory locations for the plural processes due to limited physical memory availability.

Upon allocating the memory, the method proceeds to step 204 where the method accesses the physical memory locations associated with the allocated memory. For example, a range of addresses(e.g. a thirty-two kilobyte memory block) may be allocated at step 203. Therefore, at step 204 the allocated memory addresses associated with the physical memory may be accessed or "touched" thereby ensuring physical memory may be assigned for the allocated logical memory. The method then proceeds to step 205 where the method deallocates the allocated memory thereby freeing physical memory locations within the system that may be used. The method then proceeds to step 206 where the method ends. Therefore, through allocating memory, accessing memory locations associated with the allocated memory, and deallocating the allocated memory, the present disclosure advantageously recovers physical memory for processes, tasks, programs, applications, etc. requiring utilization of physical memory.

In one embodiment, upon accessing physical memory at step 204, an operating system associated with a system's physical memory may copy or page information from physical memory to a storage device, such as a hard disk drive. Information may be paged out of physical memory based upon various criteria. For example, information located in physical memory that may not have been used or accessed for an extended period of time may be paged to a storage device. In this manner, frequently accessed information remains within physical memory while an increased availability of physical memory may be provided through paging out infrequently used or accessed information stored within physical memory. In one embodiment, the operating system may also compact a series or range of memory locations within physical memory to provide contiguous physical memory locations. Compacting physical memory includes moving or shifting data to create contiguous blocks of physical memory and may include compacting portions, address ranges, or blocks of physical memory. Compacting advantageously reduces fragments caused by some processes and applications thereby providing contiguous memory locations.

The method of FIG. 2 recovers physical memory through allocating, accessing, and deallocating memory thereby reducing undesirable effects caused by previous programs not deallocating memory and associated physical memory locations. For example, a virtual memory manager (VMM) may utilize physical memory for various services, messages, macros, and structures used by the VMM to manage virtual devices and their corresponding hardware devices or services. The VMM may not deallocate all of the memory allocated for managing a virtual device. Therefore, the present disclosure advantageously recovers physical memory allocated by previous applications, such as VMM associated processes, through recovering physical memory locations.

Figure 3:
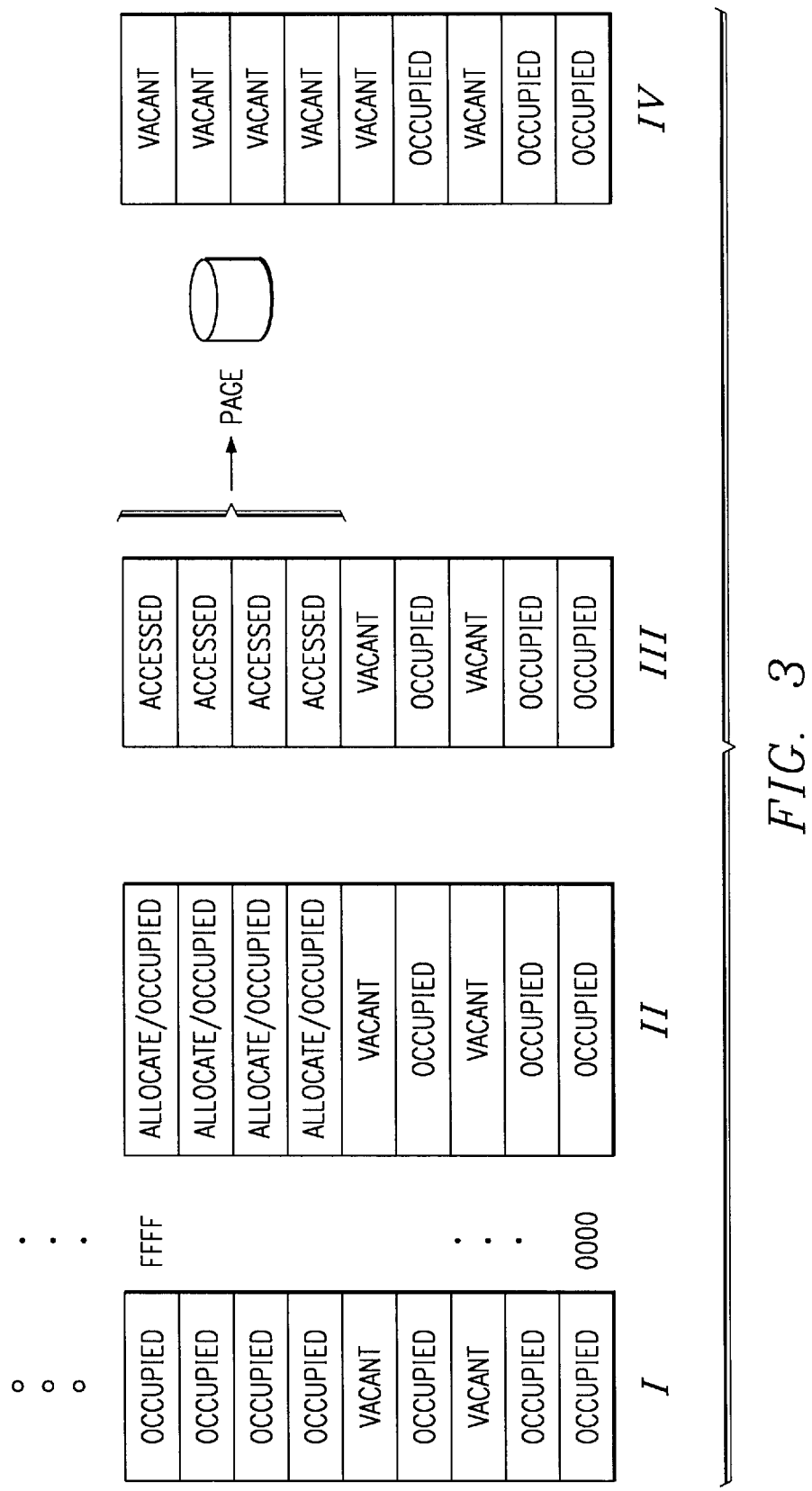
FIG. 3 is a block diagram illustrating recovered physical memory within a computer system according to one embodiment of the present disclosure.

Referring now to FIG. 3, a block diagram illustrating a segment of physical memory within a system according to one embodiment of the present disclosure is shown. FIG. 3 illustrates one embodiment having four phases representing recovering physical memory as described by the present disclosure.

Phase I illustrates a segment of physical memory that includes "occupied" and "vacant" locations within physical memory. The segment of physical memory may be configured in pages such that one page is four kilobytes in size. The "occupied" pages of memory may include various types of information operable to be stored within physical memory. The "vacant" pages of memory are locations within physical memory that may be allocated and occupied as required.

Phase II illustrates four previously occupied pages of memory that have been used or occupied by another process or program. Phase II illustrates allocating the previously used or occupied pages as referenced by "allocate/occupied". However, the present disclosure may allocate "vacant" locations within physical memory in accordance with the present disclosure. Therefore, Phase II illustrates one embodiment of allocating occupied pages within physical memory wherein various combinations of "occupied" and "vacant" pages may be allocated.

Phase III illustrates one embodiment where allocated memory locations comprise occupied pages that are paged out when accessed. The information stored within the accessed pages are paged out or copied to a storage device thereby providing physical memory locations for the allocated memory of Phase II. Though not shown, other embodiments may include paging selective information from various pages that may or may not be contiguous. For example, information that has not been accessed or used for an extended period of time may be selected to be paged to a storage device.

Phase IV illustrates the segment of memory after deallocation of the previously allocated memory occurs. The deallocated memory is indicated as being vacant and is available for use. Therefore, through allocating, accessing, and deallocating memory, physical memory locations within a system may be recovered for utilization of, for example, critical and non-critical processes.

In one embodiment, the memory segment illustrated in FIG. 3 may by compacted (not shown) to provide a contiguous locations of memory while reducing fragments within the physical memory segment. For example, a fragment may be caused by moving, copying or deallocating pages of memory. The fragmented portion of memory creates discontinuous memory locations which may lead to inefficient use of physical memory. Therefore, compacting physical memory may increase the amount of available physical memory while providing contiguous memory locations within physical memory allowing efficient allocation of physical memory.

Though not illustrated in FIG. 3, the present disclosure may provide sparse memory allocation for applications or processes. Sparse memory allocation includes using non-contiguous memory locations for a process or application. The sparse memory locations may be allocated, accessed, and deallocated thereby recovering sparse physical memory locations.

Figure 4:
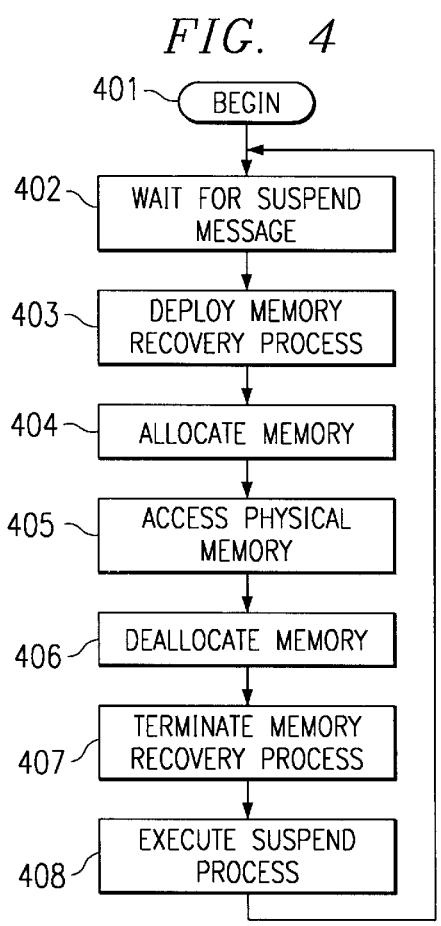
FIG. 4 is an illustration of a flow diagram of a method for utilizing recovered physical memory according to an embodiment of the present disclosure.

Referring now to FIG. 4, an illustration of a flow diagram of a method for providing recovered physical memory for a process according to an embodiment of the present disclosure is shown. The method may be operable to be used by system 100 as illustrated in FIG. 1 or other systems operable to deploy the method illustrated in FIG. 4. FIG. 4 illustrates one embodiment of the present disclosure for recovering physical memory in response to detecting a suspend message. Though not illustrated, several types of events or messages detectable by a computer system may be used in association with the method illustrated in FIG. 4.

The method begins at step 401. At. step 402, the method waits until a suspend message is detected. The method then proceeds to step 403 where the method deploys a memory recovery process for recovering physical memory. The memory recovery process recovers physical memory for use by a suspend process or routine associated with the suspend message through allocating, accessing, and deallocating memory thereby recovering physical memory for use by the suspend message.

Upon deploying the memory recovery process, the method proceeds to step 404 where the method allocates memory in association with the suspend process. For example, if the suspend process requires thirty-two kilobytes of contiguous memory, the method may allocate two megabytes to attempt to provide thirty-two kilobytes of contiguous memory for the process. The method then proceeds to step 405 where the method accesses or touches the allocated memory thereby providing physical memory locations associated with the allocated memory. Through accessing each physical memory location, the present disclosure allows for physical memory (e.g. 32 KB) to be provided in association with the allocated memory. In this manner, physical memory locations are committed and do not run the risk of being allocated to other parallel processes. For example, other applications may be executed in parallel with the method of FIG. 4 and may utilize various physical memory locations. The method of FIG. 4 ensures that physical memory locations are provided for the allocated memory of step 404 through accessing the physical memory locations.

Upon accessing the physical memory locations, the method proceeds to step 406 where the method deallocates the allocated memory. For example, if two megabytes of memory were allocated, the method would deallocate the physical memory locations accessed at step 405. In this manner, physical memory locations can be recovered for utilization in association with the suspend process. Deallocating physical memory makes available the amount of memory previously allocated.

In one embodiment, the method may also deploy a process called garbage collecting in association with deallocating memory. Garbage collecting removes information stored within physical memory locations that is no longer required or needed when a process or application finishes executing.

Upon deallocating or freeing up the physical memory locations, the method proceeds to step 407 where the memory recovery process ends. Therefore, the method recovers physical memory in association with a suspend message thereby ensuring physical memory is available for the suspend process through allocating, accessing, and deallocating memory thereby recovering physical memory. Upon recovering the physical memory locations, the method proceeds to step 408 where the suspend process is executed in association with the recovered physical memory. The method then proceeds to step 402 where the method waits for a suspend message.

In one embodiment, the method of FIG. 4 may be operable with an operating system to copy or page out information for freeing up physical memory locations. For example, upon accessing physical memory at step 405, an operating system associated with physical memory may copy or page information from physical memory to a storage device, such as a hard disk drive. Information may be paged out of physical memory based upon various criteria as described above. For example, information located in physical memory that has not been used or accessed for an extended period of time may be paged to a storage device. Additionally, the present disclosure may be operable with an operating system that may compact locations within physical memory to provide contiguous physical memory locations. Compacting physical memory includes moving or shifting data to provide contiguous blocks of physical memory and may include compacting, for example, several portions, addresses, or blocks of physical memory. In one embodiment a table or list for a system's physical memory may be accessed and updated. The table may include descriptive information associated with physical memory locations. The description information may be used to identify selective information such as use, size, etc. for paging or copying to a storage device.

The method of FIG. 4 may also be operable to enable additional allocation of physical memory for a process or program. For example, a virtual device may require contiguous physical memory locations that may vary in size over time due to dynamic changes in data structures. The method of FIG. 4 may be operable to provide contiguous memory locations as required enabling a virtual device to efficiently modify data structures while maintaining contiguous allocation of physical memory locations.

The present disclosure may also be operable to account for adjusting physical memory locations associated with altering the contents and addresses of physical memory. For example, compacting physical memory may cause addresses associated with previously allocated processes to be altered. The present disclosure may be operable to update address information associated with allocated physical memory locations upon altering physical memory addresses.

The method of FIG. 4 may also support virtual devices having pageable code segments through allowing rarely-used code segments to be paged out for freeing up physical memory. The method may be operable to identify and monitor pageable code segments such that the rarely-used code segments can be copied to a storage device freeing up physical memory thereby recovering physical memory for subsequent use.

The present disclosure through recovering physical memory may be operable prior to executing a process, during execution of a process, or post execution of a process. For example, the present disclosure may recover physical memory after executing a process thereby freeing up memory for subsequent processes or applications. In another embodiment, the present disclosure may also be used as a utility that may be periodically deployed for recovering physical memory for parallel or subsequent use. Therefore, the present disclosure provides for recovering physical memory for associated and non-associated processes or programs requiring use of physical memory thereby reducing undesirable effects associated with limited memory availability.

Therefore, the present disclosure provides systems and methods for recovering physical memory in a computer system. The method allocates memory and accesses or touches memory thereby providing physical memory locations associated with the allocated memory. Physical memory becomes available or recovered upon deallocating or freeing up the physical memory locations associated with the allocated memory. In this manner, physical memory may be recovered for utilization.

The present disclosure may be used in association with any operating system (i.e. WINDOWS, LINUX, etc.), process, program, etc. that utilizes virtual memory. Through recovering physical memory, the present disclosure reduces errors associated with program leaks caused by not de-allocating memory. Therefore, the present disclosure advantageously allows efficient utilization and recovery of physical memory for subsequent or parallel processes while eliminating undesirable effects caused by inefficient utilization of physical memory.

Although the disclosed embodiments have been described in detail, it should be understood that various changes, substitutions and alterations can be made to the embodiments without departing from their spirit and scope.

What is claimed is:

1. A method for recovering physical memory locations in a computer system having a memory device and an operating system, the method comprising:

allocating a contiguous block of memory within the computer system;

accessing recoverable physical memory locations associated with the allocated block of memory; and deallocating the allocated block of memory upon accessing the recoverable physical memory locations.

2. The method of claim 1, further comprising utilizing the deallocated memory locations.

3. The method of claim 1, wherein the accessing comprises copying information stored within the memory device to a storage device.

4. The method of claim 1, further comprising:

detecting an event; and executing the event in association with the recoverable physical memory.

5. The method of claim 4, wherein the event comprises a critical event.

6. The method of claim 4, wherein the event comprises a suspend event.

7. A method for recovering physical memory operably associated with a computer system having a memory device and operating system, the method comprising:

detecting an event associated with a process;

allocating a contiguous portion of the physical memory in response to the event;

accessing the allocated portion of physical memory; and deallocating the allocated portion of physical memory.

8. The method of claim 7, further comprising copying information based upon a predetermined criteria to a storage device operably associated with the system.

9. The method of claim 7, further comprising executing the process in association with the deallocated portion of physical memory.

10. The method of claim 7, further comprising compacting at least a portion of physical memory, based on process termination, the compacting to provide contiguous memory locations within the physical memory.

11. The method of claim 9, further comprising deallocating a portion of physical memory associated with the executed process.

12. A computer system comprising:
- at least one processor;
- at least one storage device;
- at least one memory device coupled to the processor; and
- a program of instructions associated with the computer system, the program of instructions having:
  - at least one instruction to allocate a contiguous portion of the memory device in response to an event;
  - at least one instruction to access a memory location associated with the allocated portion of the memory device; and
  - at least one instruction to deallocate the allocated portion of the memory device, the deallocated memory operable to be used in association with the event.

13. The computer system of claim 12, wherein the program of instructions further comprises at least one instruction to copy information from the memory device to the at least one storage device.

14. The computer system of claim 12, wherein the program of instructions further comprises at least one instruction to execute a process in association with the portion of recovered physical memory.

15. The computer system of claim 12, wherein at least one portion of the physical memory may be configured as a page.

16. The computer system of claim 12, wherein the program of instructions further comprises:
- at least one instruction to copy information to a storage device associated with the system, the copy in response to the access; and
- at least one instruction to compact at least a portion of memory to provide contiguous memory locations within the memory device.

17. A method for recovering physical memory within a computer system having a memory device, the method comprising:
- detecting an event requiring a memory size;
- allocating a contiguous block of memory based upon the detected event;
- accessing at least one portion of physical memory in association with the allocated block of memory; and
- deallocating the at least one portion of physical memory, the deallocated physical memory operable to be used in association with the event.

18. The method of claim 17, wherein the allocating comprises allocating a memory size larger than the required memory size.

* * * * *